(12) United States Patent
Gaud et al.

(10) Patent No.: US 6,167,611 B1
(45) Date of Patent: Jan. 2, 2001

(54) PROCESS FOR PRODUCING A VERTICAL MAGNETIC HEAD

(75) Inventors: Pierre Gaud, Saint Egreve; Henri Sibuet, Le Fontanil; Christine Louis, Coublevie; Nathalie Vallet, Grenoble, all of (FR)

(73) Assignee: Commissariat a l'Energie Atomique, Paris (FR)

(*) Notice: Under 35 U.S.C. 154(b), the term of this patent shall be extended for 0 days.

(21) Appl. No.: 08/850,002

(22) Filed: May 1, 1997

Related U.S. Application Data

(62) Division of application No. 08/395,907, filed on Feb. 28, 1995.

(30) Foreign Application Priority Data

Mar. 7, 1994 (FR) .................................................. 94 02595

(51) Int. Cl.$^7$ .................................................. G11B 5/127
(52) U.S. Cl. .................................................. 29/603.14; 29/603.15; 29/603.18; 427/131; 216/22
(58) Field of Search .......................... 29/603.15, 603.14, 29/603.13, 603.18; 360/126, 119, 122, 123; 427/129, 131; 216/22

(56) References Cited

U.S. PATENT DOCUMENTS

| | | | |
|---|---|---|---|
| 3,968,565 | * 7/1976 | Bertens et al. ......................... | 216/22 |
| 4,286,299 | 8/1981 | Shirahata et al. . | |
| 4,535,376 | 8/1985 | Nomura et al. . | |
| 4,670,972 | * 6/1987 | Sakakima ............................. | 29/603.13 |
| 4,837,924 | * 6/1989 | Lazzari ............................... | 29/603.14 |
| 4,947,541 | * 8/1990 | Toyoda et al. ....................... | 29/603.15 |
| 4,949,207 | * 8/1990 | Lazzari ............................... | 29/603.14 |
| 5,034,089 | * 7/1991 | Dee et al. ............................. | 216/22 |
| 5,059,278 | 10/1991 | Cohen et al. . | |
| 5,062,196 | * 11/1991 | Deroux-Dauphin ............... | 29/603.15 |
| 5,090,111 | 2/1992 | Lazzari . | |
| 5,195,004 | 3/1993 | Okuda et al. . | |
| 5,208,716 | 5/1993 | Lazzari . | |
| 5,224,260 | * 7/1993 | Fedeli et al. ......................... | 29/603.14 |
| 5,250,150 | 10/1993 | Gaud et al. . | |
| 5,450,263 | 9/1995 | Desaigoudar et al. . | |
| 5,490,028 | 2/1996 | Ang et al. . | |
| 5,566,442 | * 10/1996 | Gaud et al. ......................... | 29/603.14 |
| 5,604,973 | * 2/1997 | Gaud et al. ......................... | 29/603.15 |

FOREIGN PATENT DOCUMENTS

| | | |
|---|---|---|
| 0 420 755 | 4/1991 | (EP) . |
| 0 443 942 | 8/1991 | (EP) . |
| 57-203321 | 12/1982 | (JP) . |
| 58-23316 | * 2/1983 | (JP) ........................................ 29/603 |
| 58-37830 | 3/1983 | (JP) . |
| 60-45920 | 3/1985 | (JP) . |
| 1-133210 | 5/1989 | (JP) . |
| WO 92/02015 | 2/1992 | (WO) . |

OTHER PUBLICATIONS

Patent Abstracts of Japan, vol. 9, No. 109 (P–355)(1832), May 14, 1985, JP–59–231723, Dec. 26, 1984.

Patent Abstracts of Japan, vol. 11, No. 378 (P–645)(2825), Dec. 19, 1987, JP–62–146419, Jun. 30, 1987.

* cited by examiner

*Primary Examiner*—Lee Young
*Assistant Examiner*—A. Dexter Tugbang
(74) *Attorney, Agent, or Firm*—Oblon, Spivak, McClelland, Maier & Neustadt, P.C.

(57) ABSTRACT

A process for producing a vertical magnetic head for reading information from a magnetic media. The head includes a substrate on which is mounted an amagnetic spacer extending perpendicular to the face of the substrate. A first magnetic material is deposited in vapor phase thin film formed on either side of the spacer. A second magnetic material is deposited on the first by electrolytic growth.

11 Claims, 10 Drawing Sheets

PROCESS FOR PRODUCING A VERTICAL MAGNETIC HEAD

This is a Division of application Ser. No. 08/395,907, filed on Feb. 28, 1995.

DESCRIPTION

1. Technical Field

The present invention relates to a vertical magnetic head and to its production process.

A preferred application is in general public video recording, but it can also be used in other fields, such as data backups and computer memories.

2. Prior Art

A magnetic recording support for video equipment, data backups or computer memories consists of numerous tracks on which are entered informations in the form of magnetic fields.

In order to increase the information density, not only is there an increase in the number of informations per unit length, but also in the number of tracks. For this purpose, there is a decrease in the width of the tracks and simultaneously the gap separating them until they are rendered contiguous.

Nowadays, in order to meet these requirements, there are mainly two types of head on the market, namely so-called metal-in-gap heads and so-called sandwich heads.

FIG. 1 shows an example of a head of the second type. This head has a substrate 2 supporting a magnetic circuit 4 constituted by a magnetic layer deposited on the upper face of the substrate, said circuit having at the front two pole pieces 5 and 7 separated by a head gap 6 formed by an amagnetic spacer. Above the magnetic circuit, said head also has an amagnetic superstrate 2. The head also has an opening 8 made through the magnetic layer, the substrate and the superstrate, as well as a conductor winding 9 using the opening 8.

The head shown in FIG. 1 is intended to cooperate with a recording support 20 oriented perpendicular to the substrate or, what amounts to the same thing, parallel to its edge.

Such heads can be called "vertical" in the sense that the active surface is perpendicular to the surface of the initial substrate.

The width of the head gap designated l is counted perpendicular to the substrate or, what amounts to the same thing, parallel to the recording support. This width l essentially corresponds to the respective width of the support tracks. Its length designated L is counted in the direction of the relative displacement of the head and the recording support 20. With regards to the height of the head gap h, it is counted parallel to the face of the substrate supporting the magnetic circuit.

Such heads cannot be confused with so-called "horizontal" heads, where the head gap is level on a face parallel to the substrate and where the recording support is moved parallel to said substrate face. A horizontal head is e.g. described in FR-A-2 604 021.

One of the essential differences between vertical heads of the sandwich type and horizontal heads (other than the obvious differences in their structure and their production process) is due to the fact that in the latter case, the width of the gap (corresponding to the track width) is defined by lithography, whereas the dimension affected during wear to the head is defined by the thickness of the deposited magnetic material. In vertical heads of the sandwich type, like that of FIG. 1, it is the width of the gap l which is defined by the thickness of the deposited magnetic material, whereas the wear affects the height h, which is adjusted by lithography.

The practical implementation of vertical sandwich heads like that of FIG. 1 involves a large number of micromechanical and high temperature welding operations and construction is usually unitary, i.e. non-collective.

Certain production processes are described in the work entitled "Recent magnetics for electronics", JARECT, vol. 10, chapter 11, pp 121–133, 1983, published by Y. SAKURAI, North-Holland, as well as in the work entitled "The complete handbook of magnetic recording", F. JORGENSEN, chapter 9, pp 196–216, 1988, published by TAS BOOKS Inc.

However, international application WO 92/02015 also proposes a process for the production of magnetic heads of the sandwich type making it possible to obtain a very well controlled vertical head gap, whose width is equal to that of the track to be read or written, the alignment of the pole pieces being easily obtained. These magnetic heads accept the inevitable wear linked with the friction of the magnetic support on the head.

The enclosed FIGS. 2a to 2d diagrammatically illustrate the known process. One starts with a substrate 16 and by different etching operations, some of which are anisotropic, as well as a thermal oxidation process, a vertical wall 24 is formed on the substrate (FIG. 2a). When the substrate is made from silicon, said wall 24 is of silicon oxide, or in other words silica.

A magnetic layer 26 is then deposited on either side of the wall 24 and is then planarized (FIG. 2b). The wall 24 will serve as an amagnetic spacer and its width perpendicular to the substrate is designated l. The magnetic circuit 28 is then defined in its overall form by photolithography (FIG. 2c).

Everything is then covered by a not shown superstrate and an opening 34 is made therein (FIG. 2d). Two notches 36 are machined and a conductor wire 38 is passed into the opening 34 and into the notches 36 and wound around the magnetic circuit 28. The friction circuit 41 is then machined. This surface is perpendicular to the upper face of the substrate. Thus, the spacer 24 is level with the edge of the machined substrate and parallel to the not shown recording support.

Although satisfactory in certain respects, this process has a problem due to the difficulty in producing a satisfactory magnetic material. Thus, beyond the usual magnetic properties required in producing a magnetic circuit, it is necessary to have a material resisting wear and which is sufficiently resistive to avoid problems associated with eddy currents when the head operates at high frequency. A magnetic material satisfying all these conditions can only be obtained by vapour deposition, e.g. cathodic sputtering. However, the thus obtained layers, which are necessarily thin, have problems linked with the expansion coefficient difference between the substrate and the magnetic material and which gives rise to separation between the layers.

The present invention solves this problem by using two magnetic materials instead of one, which are of different types, in the area of the head gap. Before giving information on the conditions under which these two materials are used, it is pointed out that magnetic heads having two materials are already known, but in the horizontal variant referred to hereinbefore and not in the vertical variant to which the present invention relates.

Such horizontal heads having two magnetic materials are desribed in FR-A-2 658 646 (or its corresponding U.S. Pat.

No. 5,224,260). The enclosed FIGS. 3 and 4 illustrate two variants of these heads.

Firstly, FIG. 3 shows in section a horizontal head comprising a lower magnetic part 50, two magnetic pillars 51, 52, a conductor winding 54 embedded in an insulator 56, two magnetic concentrators 55, 56 and two upper pole pieces respectively constituted by a first magnetic material 57, 58 electrolytically deposited on a conductive underlayer 59 and a second magnetic circuit 61, 62 deposited by cathodic sputtering. These two pole pieces are separated by an amagnetic spacer 64. The assembly is embedded in an insulating layer 66. The recording support 70 is parallel to the upper surface of the head, as for all horizontal heads.

FIG. 4 shows another variant, where similar components are encountered and for this reason carry the same references, but where the two magnetic materials are arranged differently. The first material 57, 58 which has been deposited electrolytically is placed on either side of the spacer 64, whereas the second material 61, 62 is outside the first. FIG. 4 also shows the friction surface 67 on which slides the recording support 70.

In the variant of FIG. 3, the magnetic material 61, 62 to be in contact with the recording support 70 has a thickness close to 1 $\mu$m and good magnetic and mechanical characteristics. This variant is suitable for recording systems where there is only limited wear to the heads. However, it is not suitable in other cases, particularly for heads installed on a rotary drum, where wear to the heads exceeds 10 $\mu$m.

In the variant of FIG. 4, the first magnetic material 57, 58, which has good mechanical properties is present over a few microns on either side of the spacer 64, whereas the second material 61, 62 having better mechanical properties whilst still ensuring good magnetic properties, occupies most of the friction surface. In order to be able to permit wear exceeding 10 $\mu$m the thickness of the second material must exceed 10 $\mu$m. However, it is very difficult to deposit by sputtering a material over such a thickness.

The problem of wear to heads particularly on magnetic tapes is consequently not completely solved in the prior art, the layer of material having good mechanical and magnetic properties and which is in contact with the recording support being too thin (variant of FIG. 3) or too thick and consequently difficult to obtain (variant of FIG. 4).

It would appear that this problem is insoluble because the requirements made are contradictory, i.e. the magnetic layer must be both thin so as to be depositable by sputtering and thick so as to withstand wear. However, the present invention aims at solving this problem.

DESCRIPTION OF THE INVENTION

To this end, the invention proposes transposing and adapting the technique of the two magnetic materials to sandwich-type vertical heads and not horizontal heads, which makes it possible to solve the set problem.

According to the invention, deposition takes place of the magnetic material having the good properties (magnetic properties, resistance to wear and resistivity) cn either side of the spacer and in thin film form and consequently so as to be compatible with vapour deposition processes and in particular cathodic sputtering. The thinness is counted in the direction of the width of the head gap in accordance with the conventions given in connection with FIG. 1. As the head has a vertical structure, the thinness of the thus deposited layer is no longer a handicap relative to the wear, because the latter will be manifested by an erosion in the direction perpendicular to the edge of the head, i.e. the direction referred to as the height of the gap in FIG. 1. Therefore the desired value can be given to said height without losing the thinness of the layer. Thus, the problem has been solved by having both a thin and high layer.

In order to increase the thickness of the magnetic circuit and decrease its reluctance, another magnetic material must be deposited, which has a mechanical and possibly magnetic quality below that of the first. This second magnetic material could be deposited by electrolytic growth or any other means.

Thus, more specifically, the present invention relates to a vertical magnetic head comprising a substrate with a face and an edge, a magnetic circuit placed on the face of the substrate and a conductor winding, said circuit having a head gap area with two pole pieces separated an amagnetic spacer, said spacer being flush with the edge of the substrate, said head being intended to cooperate with a recording support moving in front of the head gap area and oriented perpendicular to the face of the substrate, said head being characterized in that the magnetic circuit has, in the head gap area a thin layer of a first magnetic material, said layer being vapour phase deposited and surrounding the spacer over the entire width l of the spacer counted perpendicular to the face of the substrate and on the complete surface defining on the substrate the pole pieces of the head gap area, and a second magnetic material having inferior mechanical properties to those of the first material.

Preferably, the first magnetic material is taken from within the group constituted by compounds based on iron and/or silicon and/or aluminium, amorphous materials including cobalt and/or niobium and/or zirconium, iron nitride or one of its derivatives.

Preferably, the second magnetic material is an alloy based on iron and/or nickel and/or cobalt and is e.g. CoFeCu, CoNiFe, etc.

The present invention also relates to a process for the production of the head as defined hereinbefore. This process is characterized in that, for forming the head gap area, it involves the following operations:

producing on a substrate an amagnetic spacer placed on the substrate, depositing on either side of said spacer at least one magnetic material for forming a head gap area, completing the magnetic circuit around the head gap area and associating a conductor winding therewith, said process being characterized in that, for forming the head gap area, it involves the following operations:

vapour deposition of a thin layer of a first magnetic material on either side of the spacer over the entire width l counted perpendicular to the substrate, depositing a second, thick magnetic material having inferior mechanical properties to those of the first material.

Preferably, the second magnetic material is deposited by electrolytic growth, either by using the first material as the electrode, or by depositing a supplementary conductive layer.

DESCRIPTION OF EMBODIMENTS

For reasons of simplicity, the following description is given for a head having a gap perpendicular to the substrate. However, the invention obviously also applies to heads having a gap with an angle to the substrate differing from 90°. The production of a head gap of the latter type is in particular described in WO 92/02015.

Figure 5A:
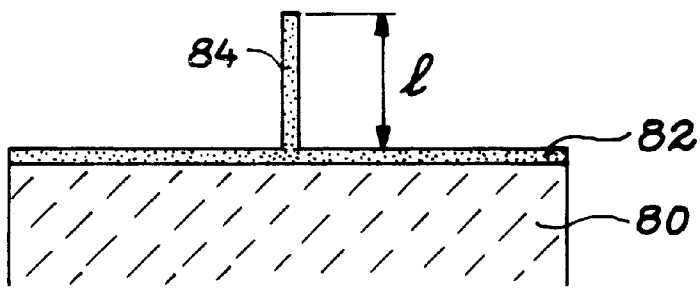
FIGS. 5a to 5g illustrate various stages of a process for producing a vertical magnetic head according to the invention.
Figure 5B:
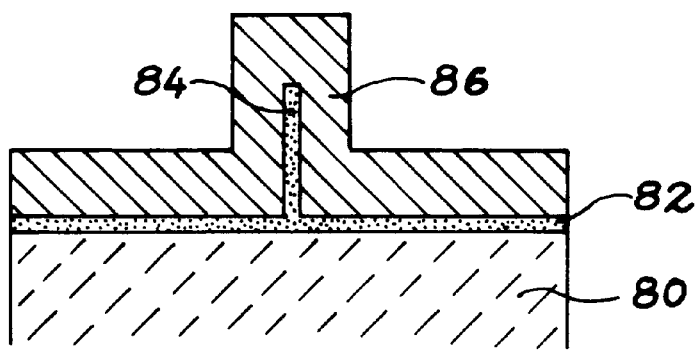
Figure 5C:
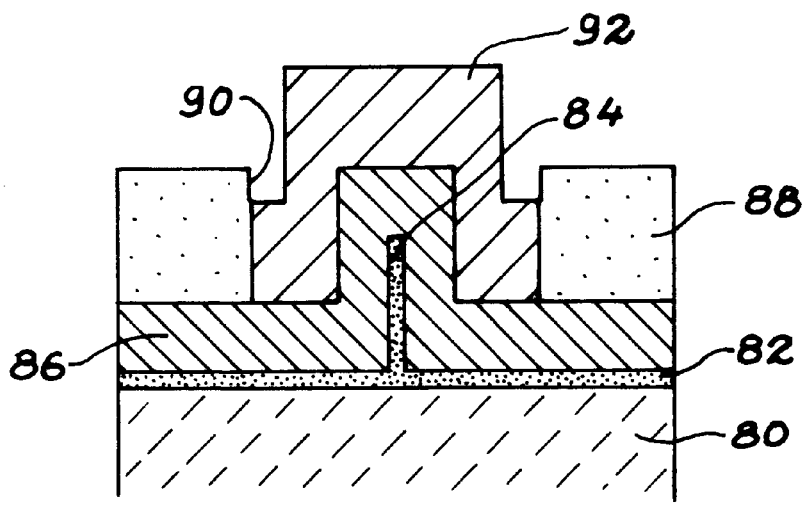
Figure 5D:
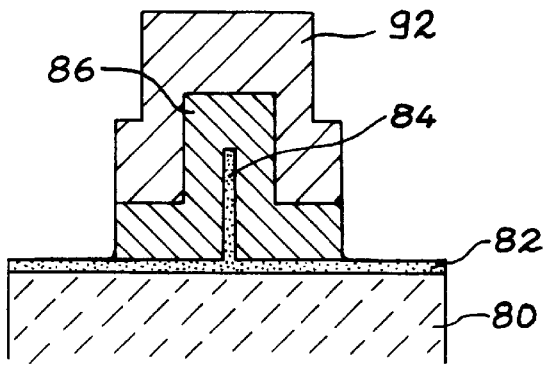
Figure 5E:
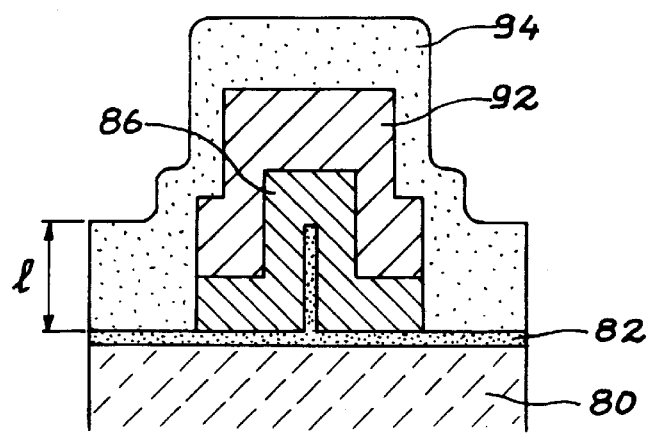
Figure 5F:
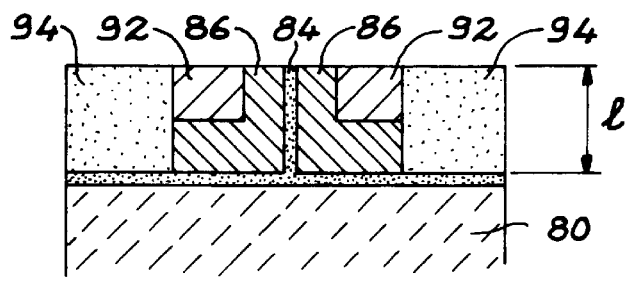
Figure 5G:
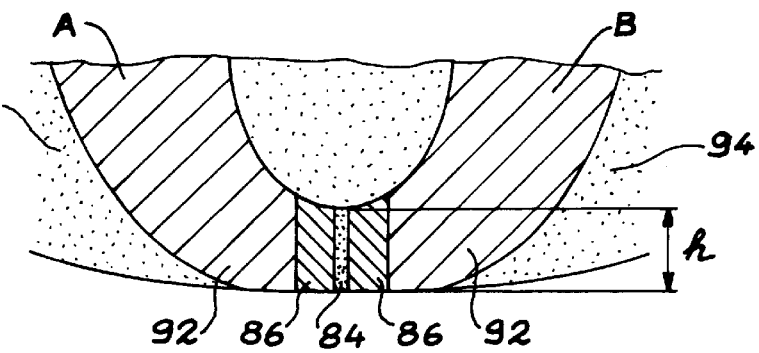

A first embodiment of the process according to the invention is illustrated in FIGS. 5a to 5g. FIGS. 5a to 5f are sections perpendicular to the substrate and FIG. 5g is a plan view.

Figure 1:
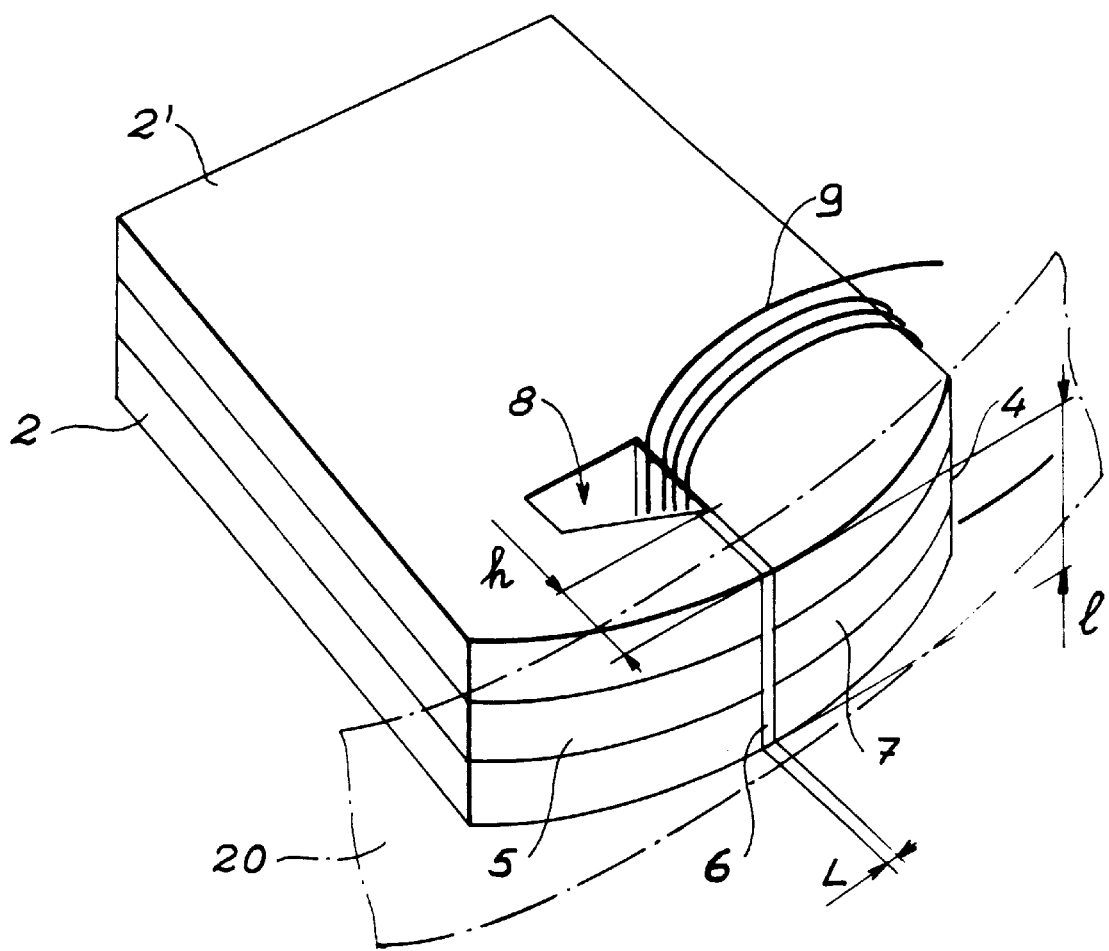
FIG. 1, already described, shows a vertical magnetic head according to the prior art.
Figure 2A:
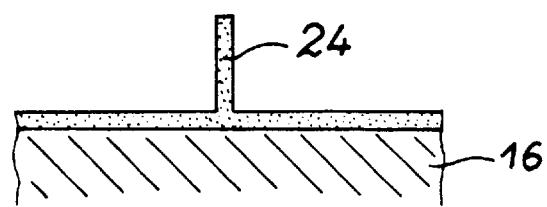
FIGS. 2a, 2b, 2c and 2d, already described, show four stages in a known process for producing a vertical magnetic head.
Figure 2B:
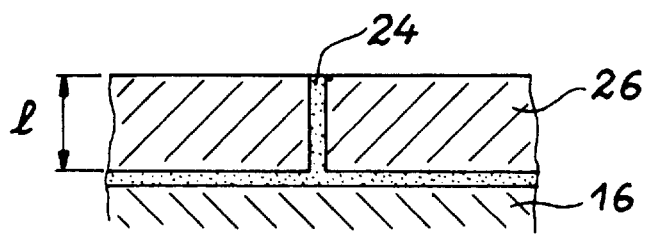
Figure 2C:
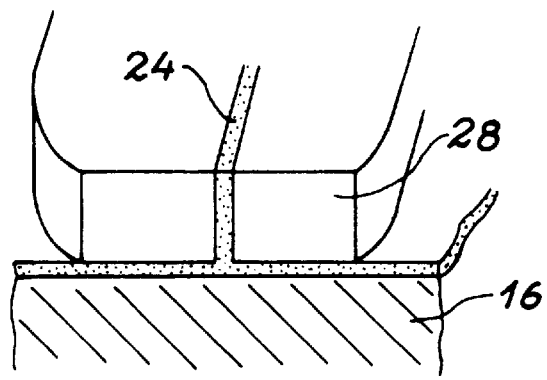
Figure 2D:
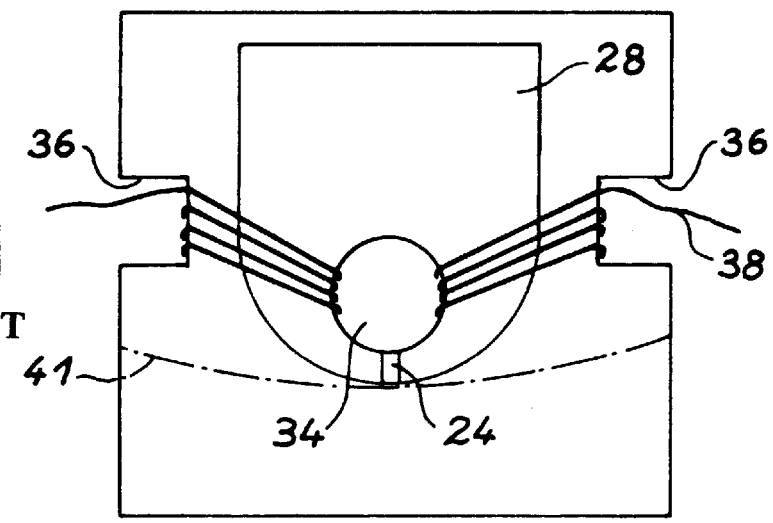
Figure 3:
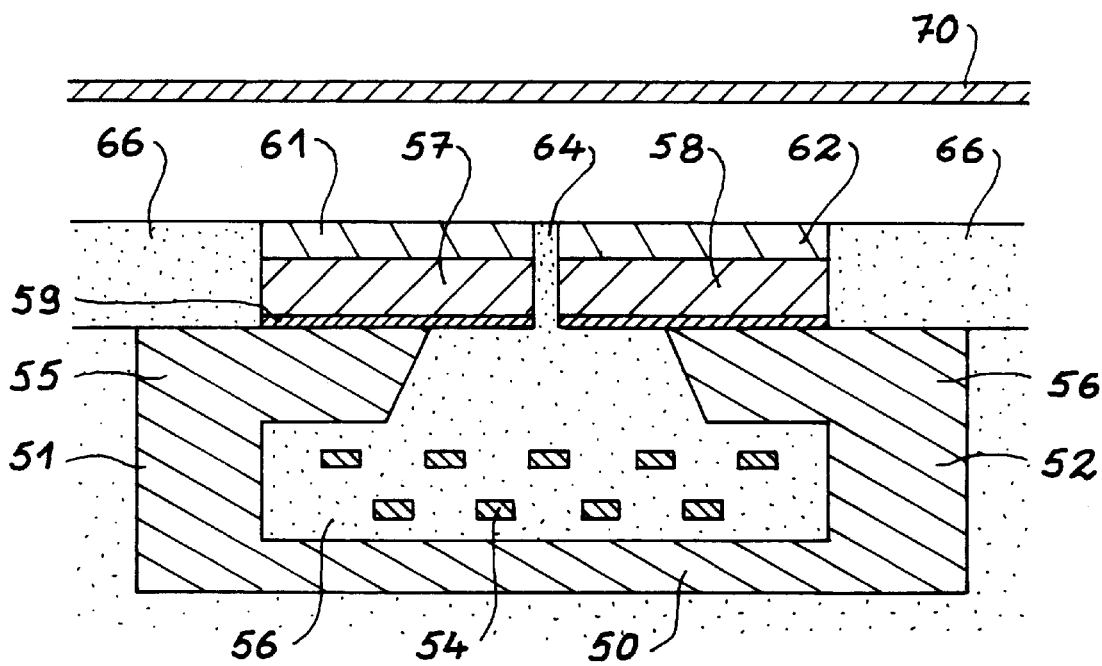
FIG. 3, already described, illustrates a first known embodiment of a horizontal head having two conductive materials.
Figure 4:
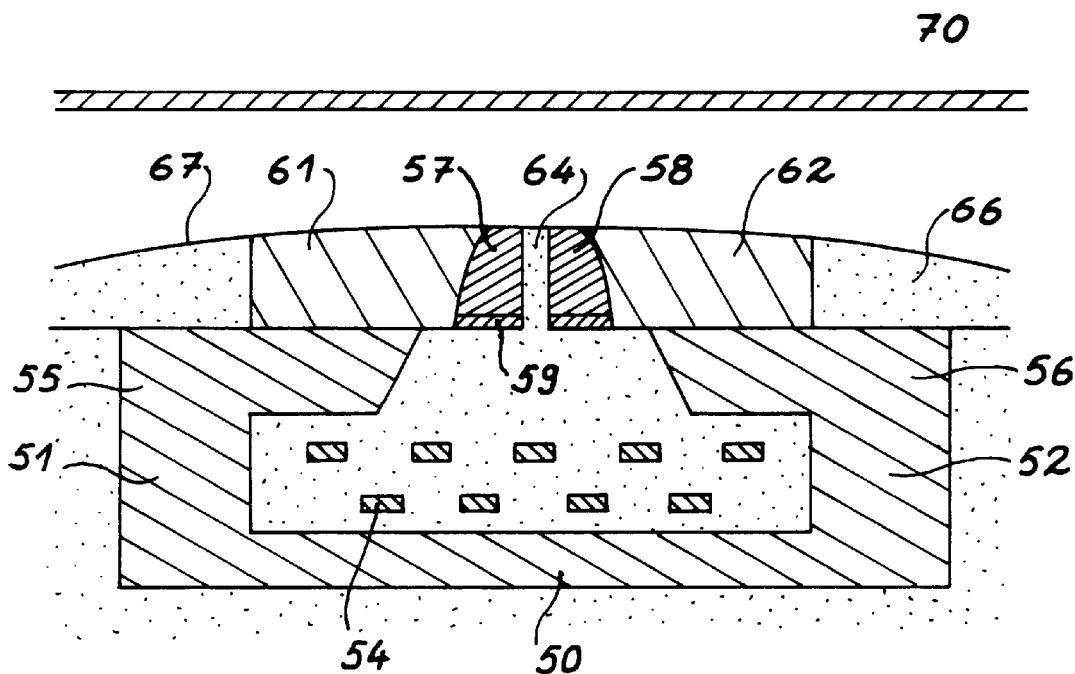
FIG. 4, already described, illustrates a second known embodiment of a horizontal head having two conductive materials.

One starts with a substrate 80, e.g. of monocrystalline silicone of crystal orientation <110>. By various etching and thermal oxidation operations described in WO 92/02015, a silicon oxide surface 82 and a silicon oxide vertical wall 84 are obtained (FIG. 5a). The height of said wall above the substrate corresponds to what is called the "width" l of the head gap in FIG. 1.

This is followed by the vapour deposition and in particular cathodic sputtering of a first magnetic material 86 (FIG. 5b). It can e.g. be an alloy known as "Sendust" (registered trademark) containing 85% iron, 5.4% aluminium and 9.6% silicon (by weight). The thickness of the deposited layer 86 is equal to or below the width of the head gap and therefore the width of the track (i.e. the height of the wall 84) in order to avoid separation problems. For example, for a recording track width of 5 μm, a 5 μm high wall 84 will be formed, but a layer 86 with a thickness of only 3 μm.

The process continues by depositing an e.g. resin mask 88 (FIG. 5c), in which is made an opening 90 which, in the region of the wall 84, is positioned above the latter. Taking the first magnetic material 86 as the conductive electrode, electrolytic growth takes place of a second magnetic material 92, e.g. of iron-nickel. The deposited height is such that the total thickness of the two magnetic materials 86, 92 on either side of the wall 84 exceeds the height of the latter.

Having removed the resin mask 88, etching takes place of the first conductive material 86 using the second material 92 as the mask (FIG. 5d). Use can be made of ionic machining.

On the assembly is then deposited an insulating, amagnetic layer 94, e.g. of silicon oxide (FIG. 5e). It is possible to use plasma-assisted chemical vapour deposition. The thickness of the layer 94 is equal to or slightly greater than the width l of the recording track.

The assembly is planarized (FIG. 5f) by stopping on the general plane of the insulating layer 94. The wall 84 has become an amagnetic spacer covered on its lateral faces by the first magnetic material 86, in the present case Sendust, which is in contact with the second magnetic material 92, e.g. iron-nickel.

FIG. 5g is a plan view, where it is possible to see the amagnetic spacer 84 in its height h, which determines the possible wear and on either side of the spacer, two branches A and B of the circuit, whose shape has been defined by the mask 88. The remainder of the circuit, which is not shown, can be obtained either from the same layers 86, 92, or from supplementary deposits of magnetic layers. Production is finished in conventional manner by placing on the assembly an amagnetic superstrate, by machining a friction surface 96, by forming a conductor coil before or after the preceding stages, all the said operations being known and described in WO 92/02015.

Figure 6A:
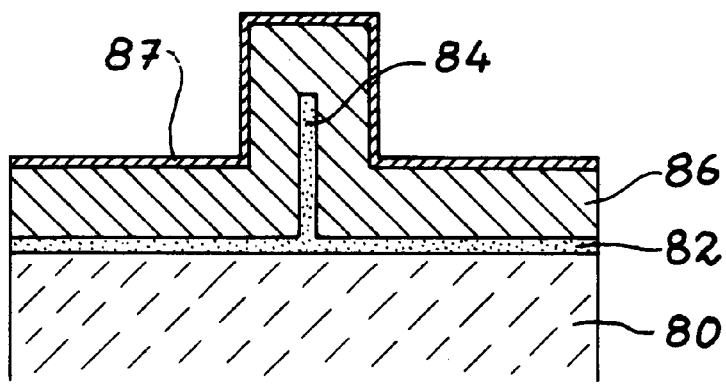
FIGS. 6a to 6c illustrate a variant using a conductive underlayer.
Figure 6B:
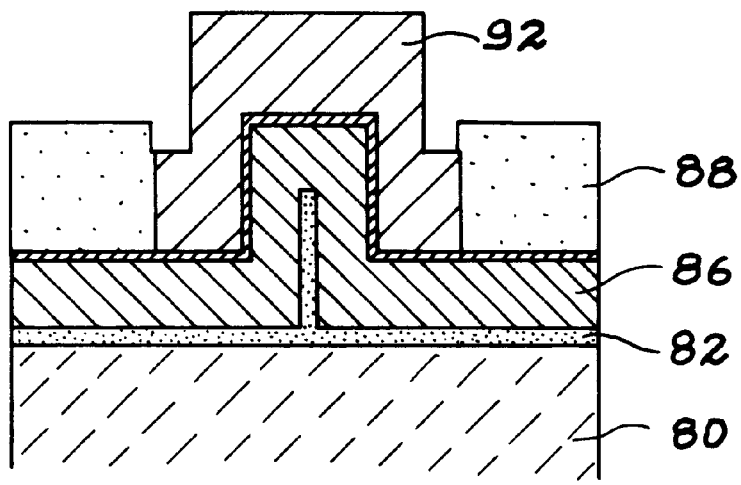
Figure 6C:
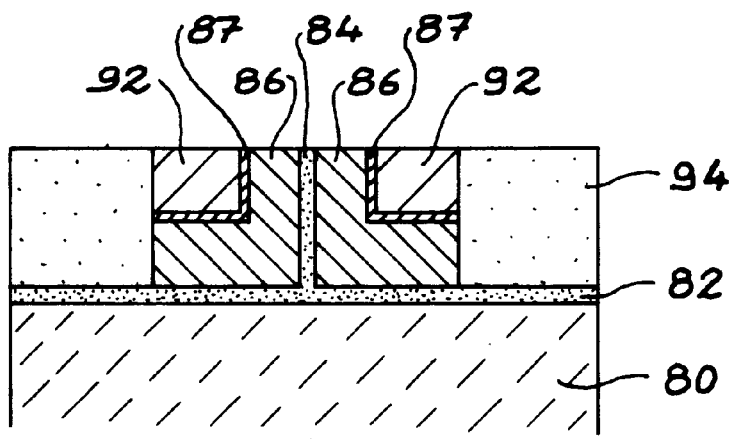

FIGS. 6a to 6c illustrate another variant of the process according to the invention. Starting with the subassembly illustrated in FIG. 5b, deposition takes place of an electrically conductive underlayer 87 on the first magnetic material 86 (FIG. 6a). It can be a 0.1 μm thick iron-nickel layer deposited by cathodic sputtering.

As in the preceding variant and by lithography, definition then takes place of the shape of the complete or partial magnetic circuit and then the second magnetic material is deposited. For this purpose deposition takes place of a mask 88 (FIG. 6b) and then said second material is grown electrolytically but, on this occasion,, using the layer 87 as the electrode, which gives the layer 92.

The operations are then the same as for FIGS. 5d to 5f. The final result is illustrated in FIG. 6c, which only differs from FIG. 5f through the existence of the underlayer 87 separating the two magnetic materials 86 and 92.

This variant is of particular interest when the first magnetic material cannot serve as an electrolytic underlayer. Moreover, the use of a supplementary layer 87 can improve the adhesion of the magnetic layer 92.

Figure 7A:
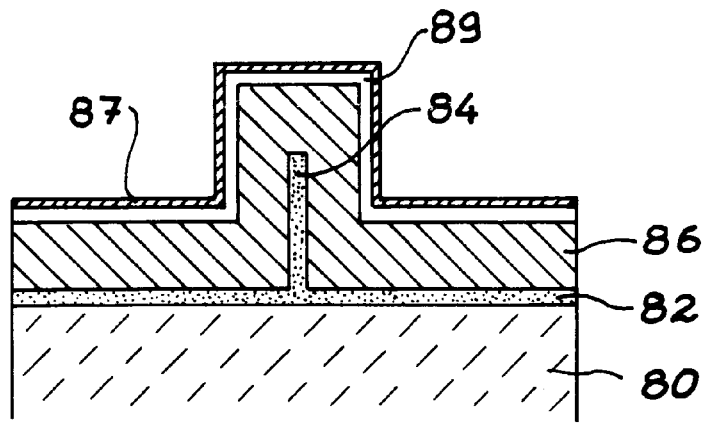
FIGS. 7a to 7c illustrate another variant having an insulating layer and a conductive underlayer.
Figure 7B:
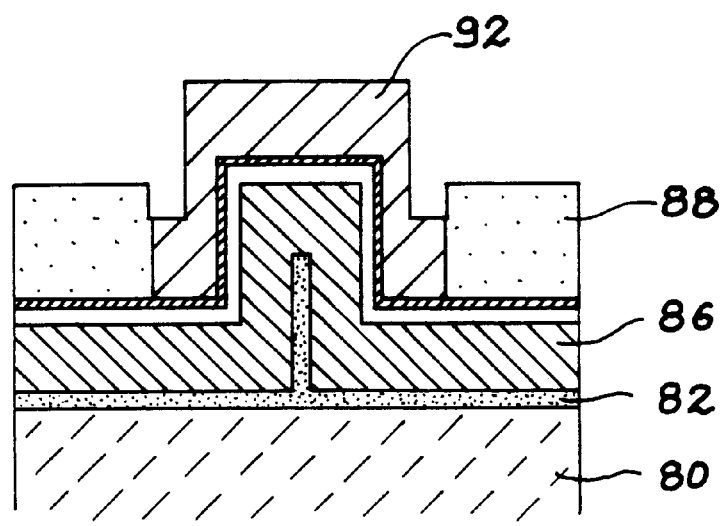
Figure 7C:
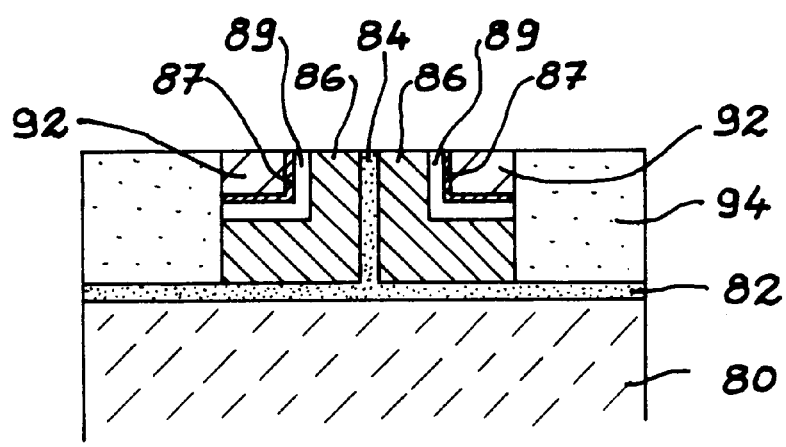

FIGS. 7a to 7c illustrate another variant where deposition takes place on the first magnetic material 86 of an insulating, amagnetic layer 89 (FIG. 7a), e.g. of silicon oxide, by plasma-assisted chemical vapour deposition. The layer 89 can have a thickness of approximately 0.1 μm. This is followed by the deposition of an electrically conductive underlayer 87 on the insulating layer 89.

The following stages are unchanged and there is an electrolytic growth of the second magnetic material 92 taking the underlayer 87 as the electrode (FIG. 7b), the deposition of an insulating layer 94 and planarization (fig . 7c).

The head obtained only differs from that of FIG. 6c by the presence of the amagnetic, insulating layer 89 separating the two magnetic materials. The use of the layer 89 makes it possible to reduce the eddy currents produced in the magnetic layers and therefore permits the use of such a head at higher frequencies.

FIGS. 8a to 8d illustrate another embodiment of the process according to the invention. Once again one starts with a substrate 80, e.g. of monocrystalline silicon of crystal orientation <100>. In said substrate is etched a recess 100 and using various known operations including etching and thermal oxidation, formation takes place of a silicon oxide layer 102 and a vertical wall 104 subdividing the recess into two portions. The height of the wall 104 slightly exceeds or is equal to the width l of the future head gap. Its thickness L corresponds to the length of the future gap.

Figure 8A:
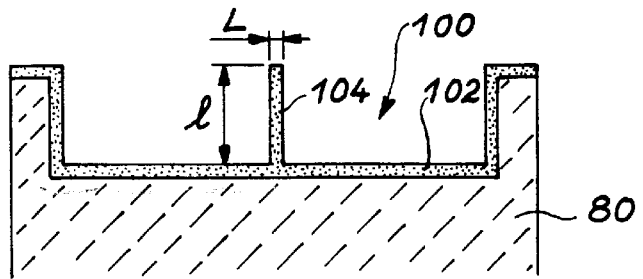
FIGS. 8a to 8d illustrate various stages of another embodiment of the process of the invention.
Figure 8B:
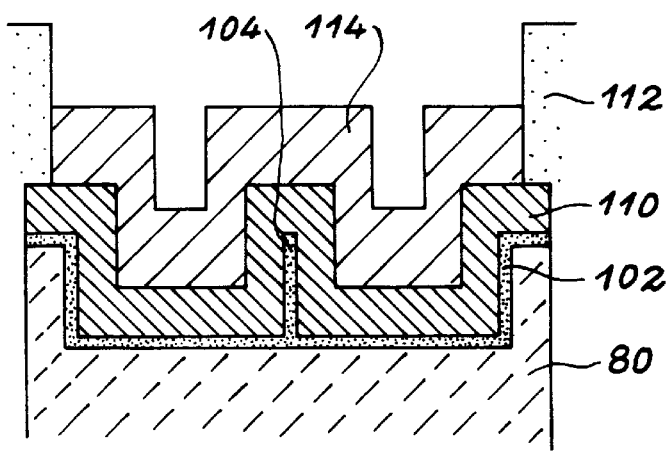

By operations similar to those described in connection with FIGS. 5b and 5f, vapour deposition and more particularly cathodic sputtering takes place of a first magnetic material 110, e.g. Sendust (registered trademark) formed from an alloy of 85% by weight iron, 5.4% by weight aluminium and 9.6% by weight silicon. The thickness of the layer 110 is equal to or smaller than the height of the wall 104, i.e. the width of. the future gap. The thickness of said layer is small in order to avoid separation problems. For example, for a track width of 5 μm, it would be possible to deposit a 3 μm Sendust layer. This is followed by the deposition of a mask 112 and, in an opening made above the recess and in the appropriate spaces, electrolytic growth takes place of the second magnetic material 114, e.g. iron-nickel (FIG. 8b). The total thickness must exceed the depth of the recess, or in other words the height of the wall 104.

Figure 8C:
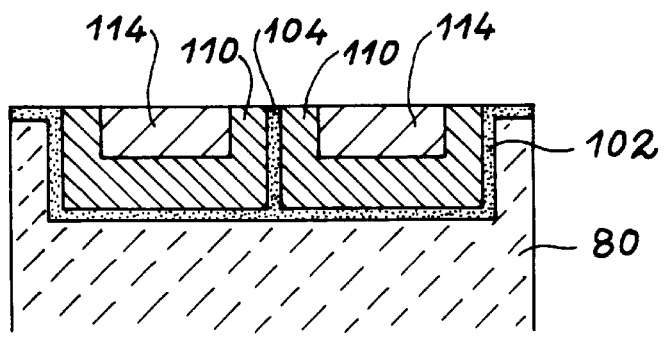
Figure 8D:
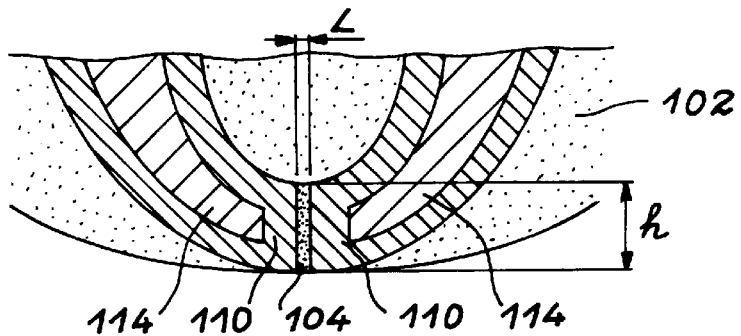

This is followed by the elimination of the mask 112, followed by the etching of the first magnetic material 110, using the second material 114 as the mask and working by ionic etching, in accordance with the operations illustrated in FIG. 5d. After planarization, the assembly shown in section in FIG. 8c and in plan view in FIG. 8d is obtained.

Figure 9:
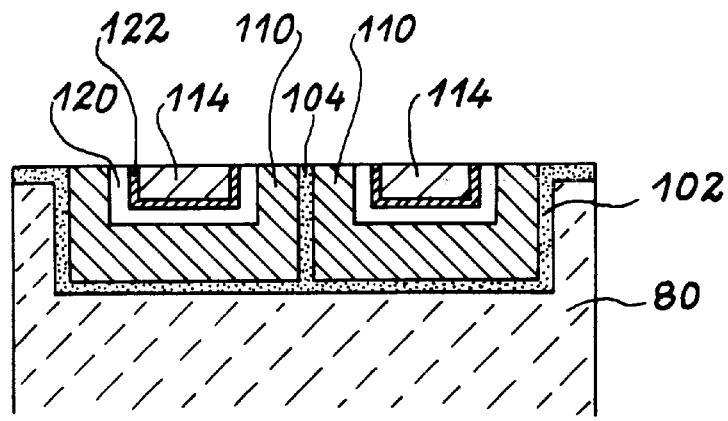
FIG. 9 shows a variant having an insulating layer and a conductive underlayer.

FIG. 9 illustrates a variant where, as in connection with FIGS. 6a to 6c on the one hand and 7a to 7c on the other, use is optionally made of an insulating, amagnetic layer 120 (e.g. of silicon oxide obtained by plasma-assisted chemical vapour phase deposition and with a thickness of 0.1 μm) and an electrically conductive layer 122 e.g. deposited by cathodic sputtering, e.g. of 0.1 μm thick iron-nickel. The latter layer serves as the electrode in the electrolytic growth stage of the second magnetic material 114.

Figure 10A:
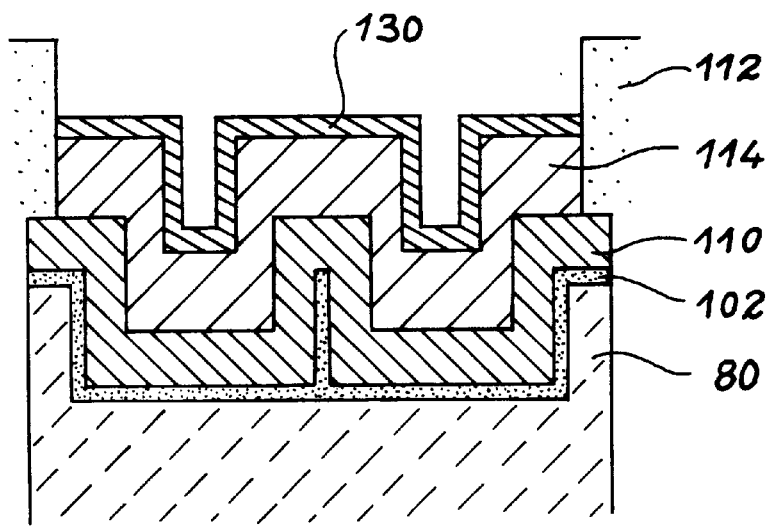
FIGS. 10a and 10b show a variant with an upper layer serving as the mask.
Figure 10B:
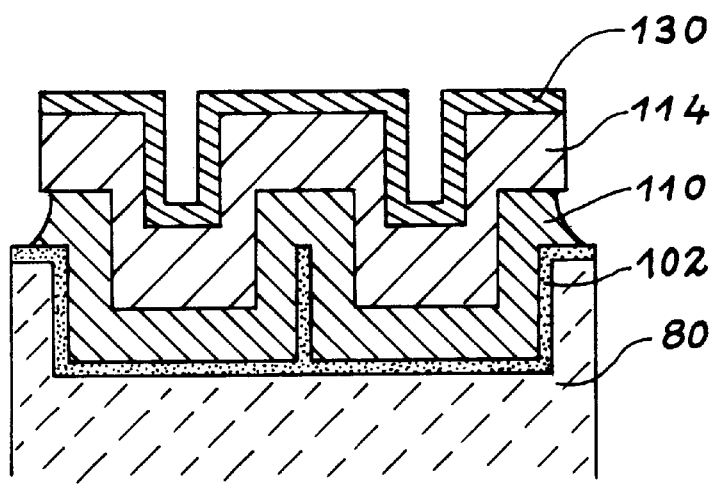

Yet another variant of the process according to the invention is illustrated in FIGS. 10a and 10b. After the electrolytic growth of the second magnetic material 114 either directly on the material 110, or on the layer 122 optionally associated with 120 (FIG. 8b), deposition takes place in the opening made in the mask 112 of a material able to serve as a mask in a chemical etching operation. This material can e.g. be electrolytically deposited gold. This layer 130 can have a thickness of 2 μm (FIG. 10a).

After removing the mask 112, the first magnetic material 110 is chemically etched (said chemical etching having a good selectivity with respect to the silicon oxide 102 deposited initially). It is e.g. possible to use a mixture of 40 ml of $H_2SO_4$+40 ml of $HNO_3$+20 ml of $CH_3COOH$+10 ml of HF+80 ml of $H_2O$ in order to etch the Sendust. This gives the subassembly illustrated in FIG. 10b. This subassembly is planarized in the manner described hereinbefore and stops on the general plane of the thermal oxide 102 (cf. FIG. 8c).

Figure 11A:
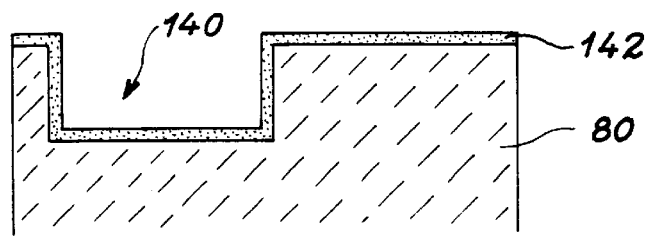
FIGS. 11a to 11d illustrate four stages of another embodiment of the process according to the invention.
Figure 11B:
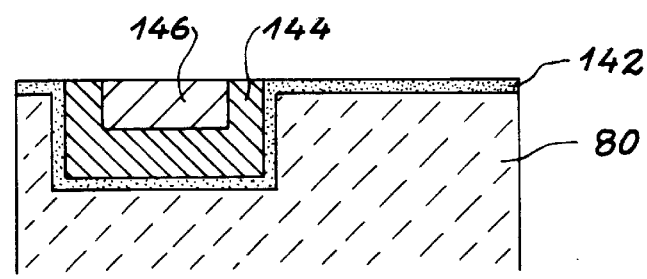

FIGS. 11a to 11d illustrate another embodiment of the process according to the invention. In a first stage illustrated by FIG. 11a, etching takes place of a first recess 140 in the substrate 80, followed by a thermal oxidation in order to form a silicon oxide layer 142. By already described operations (vapour deposition, electrolytic growth, etching, planarization), deposition takes place of the two magnetic materials 144 and 146 (FIG. 11b—to be compared with FIG. 8c).

Figure 11C:
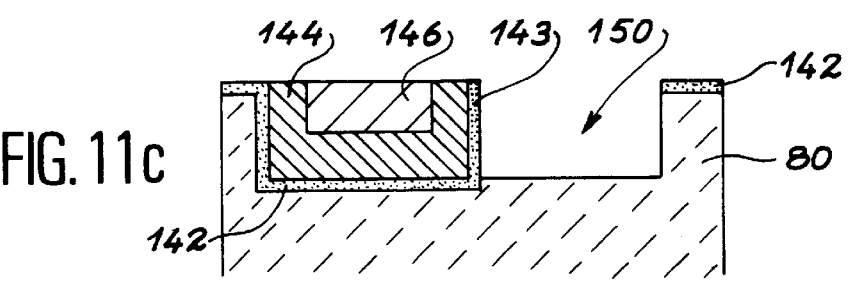
Figure 11D:
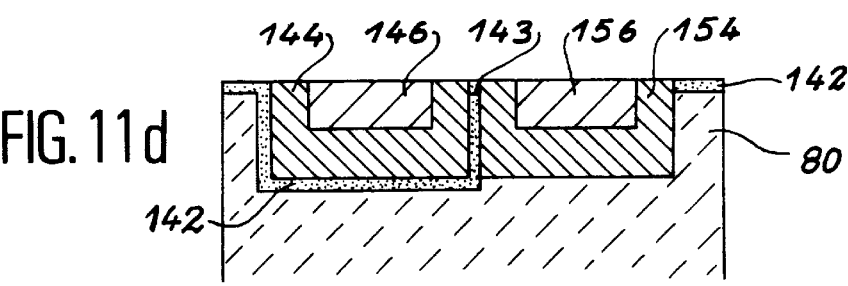

This is followed by the etching of a second recess 150, leaving the oxide wall 143 in place (FIG. 11c). Once again using the same operations, deposition takes place of the two magnetic materials 154, 156 in the second recess (FIG. 11d).

In the thus obtained head, the wall 143 separates the two pole pieces 144, 146 on the one hand and 154, 156 on the other. In addition, in the first recess the oxide layer 142 completely insulates the material 144 from the substrate 80, whereas in FIG. 8c there is a complete insulation of the magnetic materials with the substrate (although the insulation of the second recess is an optional supplementary stage).

Figure 12:
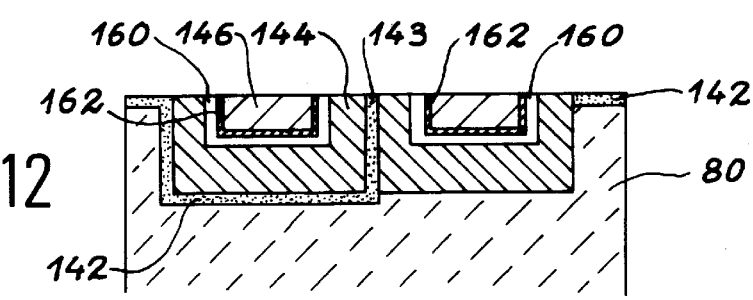
FIG. 12 shows another variant with an insulating layer and a conductive underlayer.

Finally, FIG. 12 illustrates an identical variant, but in which deposition takes place in the first and second recesses optionally of an amagnetic, insulating layer 160 and an electrically conductive underlayer 162 used for the electrolytic growth of the second magnetic material.

The production process according to the invention is suitable for a collective production of heads in the manner described e.g. in WO 92/02015.

What is claimed is:

1. A process for producing a vertical magnetic head comprising, the steps of:
   producing on a substrate an amagnetic spacer having a height (l) above the substrate;
   depositing on either side of said spacer magnetic material for forming a head gap area, including the steps of,
   (a) depositing by vapour deposition a layer of a first magnetic material on the substrate and on either side of the spacer in a direction perpendicular to the substrate, wherein the layer of the first magnetic material has a thickness less than or equal to (l), and
   (b) depositing after the vapour deposition a second magnetic material above the first magnetic material wherein the second magnetic material has inferior mechanical properties to those of the first magnetic material and is thicker than the first magnetic material; and
   completing a magnetic circuit around the head gap area by associating a conductor winding therewith.

2. Process according to claim 1, wherein said step (b) comprises the step of:
   electrolytically growing the second magnetic material.

3. Process according to claim 2, wherein the second magnetic material is electrolytically grown, and the first magnetic material is used as an electrode.

4. Process according to claim 2, wherein the second magnetic material is electrolytically grown by deposition on an electrically conductive layer which is used as an electrode.

5. Process according to claim 2, further comprising the steps of:
   depositing a layer of an insulating, amagnetic material on the first magnetic material;
   depositing an electrically conductive layer on said insulating, amagnetic layer; and
   using said conductive layer as the electrode for electrolytically growing the second magnetic material.

6. Process according to claim 1, wherein said step (b) comprises a cathodic sputtering operation.

7. A process according to claim 1, wherein;
said step (a) comprises,
   on the substrate on which has been formed the magnetic spacer, vapour depositing the layer of the first magnetic material, which surmounts the spacer and partly extends over the substrate on either side of the spacer over a thickness less than the height of the spacer; and
said step (b) comprises,
   depositing a first mask in which is formed an opening located above the spacer;
   depositing the second magnetic material on the first magnetic material in the opening made in the first mask, said second magnetic material covering the first magnetic material in the opening, removing the first mask, etching the layer of the first magnetic material using the layer of the second magnetic material as the mask, depositing on the thus etched subassembly an insulating layer with a thickness slightly exceeding or equal to the width of the desired head gap, planarizing the assembly to the level of the insulating layer, which frees the spacer.

8. A process according to claim 1, wherein said step of producing said spacer comprises, etching in the substrate a recess having a depth slightly exceeding or equal to the width of the desired head gap, and forming in said recess an insulating layer and the amagnetic spacer, which subdivides the recess into two portions;

said step (a) comprises, vapour depositing on the assembly a thin layer of the first magnetic material, which fills the recess over a height less than the height of the spacer and extending on either side of the recess on the substrate;

depositing a first mask on the assembly, defining in said fast mask an opening positioned above the spacer and wider than the recess, depositing the second magnetic material in said opening and on the first magnetic material, removing the first mask, planarizing the assembly until the spacer is level with the insulating layer covering the substrate.

9. A process according to claim 8, wherein after removing the first mask and prior to planarization, the process comprises etching the layer of the first magnetic material using the second magnetic material as a second mask.

10. A process according to claim 9, wherein:

before removing the first mask, depositing takes place on the second magnetic material a further masking layer of material able to serve as a mask in chemical etching, removing the first mask, etching the first magnetic material using the further masking layer as the mask.

11. A process for producing a vertical magnetic head, comprising the steps of:

completing a first phase of an assembly including the steps of, forming in a substrate a first recess having a certain depth slightly exceeding or equal to the width of a desired head gap, forming an insulating layer using an insulating material on the substrate, depositing by vapour deposition a layer of a first magnetic material in said first recess, said layer having a thickness less than the depth of the first recess, depositing after the vapour deposition a second magnetic material on the first magnetic material, wherein the second magnetic material has inferior mechanical properties to those of the first magnetic and is thicker than the first magnetic material, and planarizing the assembly in order to make the assembly level with the insulating layer on the substrate; and completing a second phase of the assembly including the steps of, etching alongside the first recess a second recess having a depth slightly exceeding or equal to the width of the desired head gap and being separated from the first recess by one of the side walls of the first recess covered with the insulating material, depositing by vapour deposition a layer of the first magnetic material in said second recess, said layer having a thickness less than the depth of the second recess, depositing the second magnetic material on the layer of the first magnetic material, wherein the second magnetic material is thicker than the first magnetic material, and planarizing the assembly in order to make the assembly level with the insulating layer on the substrate.

* * * * *